UNITED STATES PATENT OFFICE.

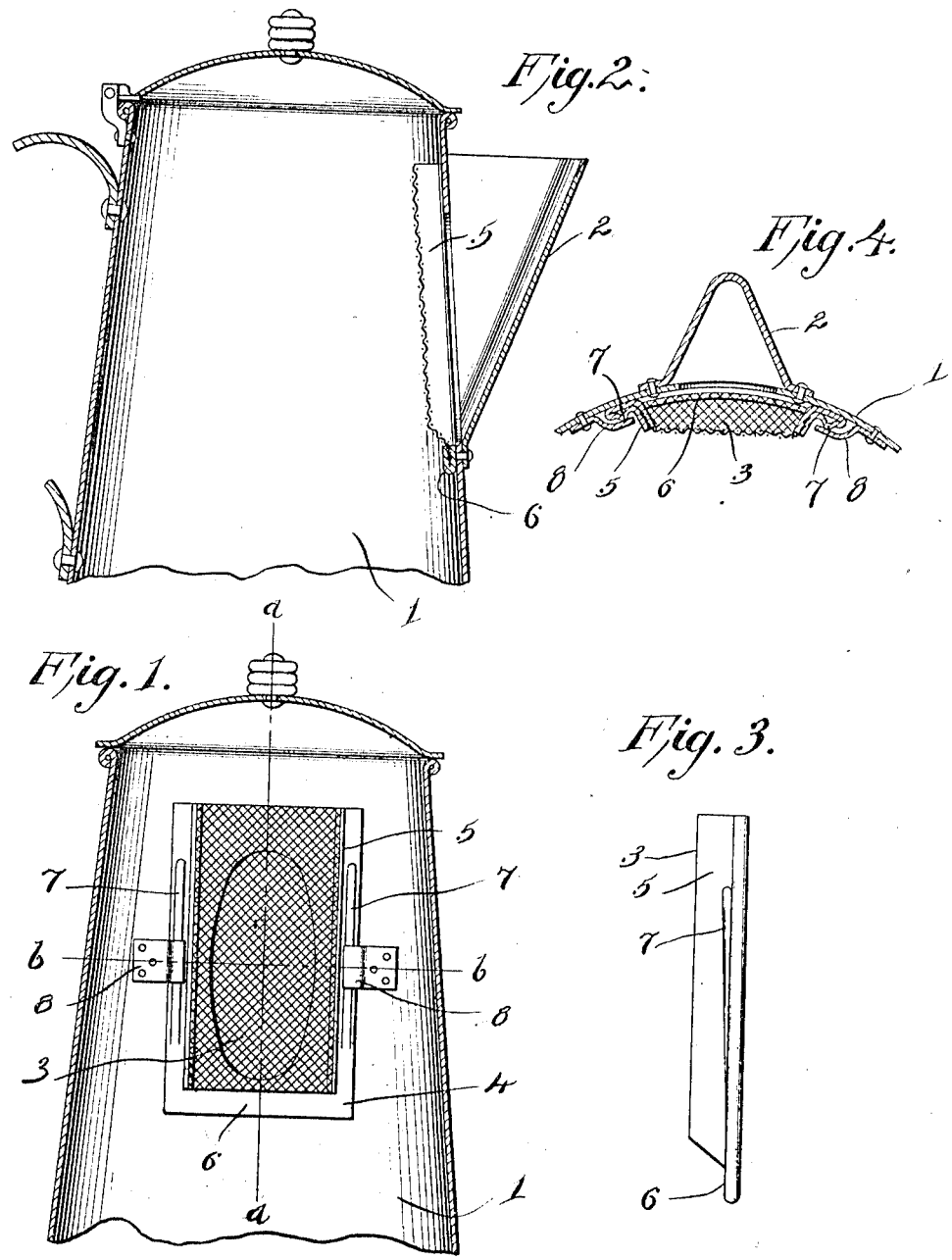

LOUIE E. WILLARD, OF CHULA, ARKANSAS.

STRAINER.

1,079,280.  Specification of Letters Patent.  Patented Nov. 18, 1913.

Application filed January 15, 1913. Serial No. 742,243.

*To all whom it may concern:*

Be it known that I, LOUIE E. WILLARD, a citizen of the United States, residing at Chula, in the county of Yell and State of Arkansas, have invented new and useful Improvements in Strainers, of which the following is a specification.

This invention relates to improvements in coffee pots and especially with reference to the provision of an improved form of strainer which is adapted to be detachably secured on the inner side of the pot directly over the intake end of the spout so as to cause the coffee poured from the pot to be strained, the invention being also adapted for use in tea pots and the like and consisting in the construction, combination and arrangement of devices hereinafter described and claimed.

In the accompanying drawing:—Figure 1 is a vertical sectional view of the upper portion of a coffee pot provided with an improved detachable strainer constructed in accordance with my invention. Fig. 2 is a vertical sectional view of the same on the plane indicated by the line a—a of Fig. 1. Fig. 3 is a detail side elevation of the strainer. Fig. 4 is a horizontal sectional view on the plane indicated by the line b—b of Fig. 1.

A coffee or tea pot of usual sheet metal construction is, for the purposes of this specification, indicated at 1, provided at one side with the usual pouring spout 2.

In accordance with my invention, I provide a strainer 3 which comprises a substantially rectangular piece of wire gauze or other foraminous material secured on the inner side of an open frame 4, which frame has side walls 5 and a lower end wall 6. The side walls are here shown as flared and, in practice, are about one-fourth of an inch wide so that when the frame is placed against the inner side of the wall of the pot, and over the intake end of the spout, the strainer will be spaced about one-fourth of an inch from the said wall, as will be understood. The side walls of the strainer frame are provided with inclined or wedge ribs 7 which converge downwardly toward the wall of the pot against the inner side of which the strainer frame is placed. The pot is provided on its inner side at points below and spaced from opposite sides of the intake end of the spout with a pair of supporting arms 8, the outer ends of which are soldered, riveted or otherwise suitably secured to the wall of the pot and the inner ends of which are adapted to engage the side walls of the strainer frame and to bear on the wedge ribs 7. These supporting arms are, in practice, made of elastic material such as suitable sheet metal.

It will be understood that when the strainer frame is placed at the required point against the inner side of the wall of the pot and moved downwardly between the supporting arms 8, the free ends of the latter bear against the side walls of the strainer frame and engage the wedge ribs 7 and coact with the said wedge ribs to detachably hold the strainer frame against the wall of the pot and clamp it firmly against the said wall. To remove the frame with its strainer from the pot, it is only necessary to draw the same upwardly from between the supporting arms 8. The strainer serves effectively to prevent dregs of coffee or tea leaves from being poured from the pot through the spout when filling coffee or tea cups.

Owing to the fact that my improved strainer may be readily removed from the pot, the same can be easily kept clean and in a sanitary condition.

I claim:—

A pot of the class described having a pouring spout and a strainer arranged on the intake end of the pouring spout and detachably secured to the wall of the pot, the said strainer having a frame provided with side walls having vertical wedge ribs the inner sides of which are inclined and converge downwardly to the side walls of the frame and the pot being provided with supporting arms on its wall to extend across the side walls of the strainer frame and bear on the inclined sides of the wedge ribs and detachably hold the strainer in place.

In testimony whereof I affix my signature in presence of two witnesses.

LOUIE E. WILLARD.

Witnesses:
 THOMAS A. CHILBURN,
 HOWARD L. SKUGGS.